United States Patent
Tohmiya

(10) Patent No.: US 12,546,609 B2
(45) Date of Patent: Feb. 10, 2026

(54) NOTIFICATION DEVICE, NOTIFICATION METHOD, AND STORAGE MEDIUM

(71) Applicant: HONDA MOTOR CO., LTD., Tokyo (JP)

(72) Inventor: Koji Tohmiya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 18/410,033

(22) Filed: Jan. 11, 2024

(65) Prior Publication Data

US 2024/0310177 A1   Sep. 19, 2024

(30) Foreign Application Priority Data

Mar. 16, 2023   (JP) .................. 2023-042117

(51) Int. Cl.
*G01C 21/34* (2006.01)
*H04L 12/18* (2006.01)
*H04W 68/02* (2009.01)

(52) U.S. Cl.
CPC ...... *G01C 21/3407* (2013.01); *H04L 12/1818* (2013.01); *H04W 68/02* (2013.01)

(58) Field of Classification Search
CPC .................................................. G01C 2/3407
See application file for complete search history.

(56) References Cited

U.S. PATENT DOCUMENTS

| | | | |
|---|---|---|---|
| 12,210,965 B2* | 1/2025 | Martin | G06N 3/092 |
| 2016/0003637 A1* | 1/2016 | Andersen | G01C 21/362 |
| | | | 701/519 |
| 2019/0265703 A1* | 8/2019 | Hicok | G06Q 10/02 |
| 2021/0080270 A1 | 3/2021 | Sugita | |
| 2021/0348935 A1* | 11/2021 | Glazberg | G05D 1/0088 |
| 2024/0011785 A1* | 1/2024 | Qiao | G01C 21/3407 |
| 2024/0310177 A1* | 9/2024 | Tohmiya | H04L 12/1818 |

FOREIGN PATENT DOCUMENTS

JP    2021-047501 A    3/2021

* cited by examiner

*Primary Examiner* — Jean Paul Cass
(74) *Attorney, Agent, or Firm* — Rankin, Hill & Clark LLP

(57) ABSTRACT

A notification device includes: an acquisition unit that acquires a destination to which a mobile body moves and an estimated arrival time of the mobile body arriving at the destination; a meeting determination unit that determines whether or not a user boarding the mobile body participates in an electronic meeting during movement of the mobile body; and a notification control unit that compares, when the user participates in the electronic meeting during movement of the mobile body, a scheduled end time of the electronic meeting with the estimated arrival time, and controls the notification unit to execute notification based on a comparison result.

7 Claims, 6 Drawing Sheets

NOTIFICATION DEVICE, NOTIFICATION METHOD, AND STORAGE MEDIUM

INCORPORATION BY REFERENCE

The present application claims priority under 35 U.S.C. § 119 to Japanese Patent Application No. 2023-042117 filed on Mar. 16, 2023. The content of the application is incorporated herein by reference in its entirety.

BACKGROUND OF THE INVENTION

Field of the Invention

The present invention relates to a notification device, a notification method, and a storage medium.

Description of the Related Art

In recent years, there is an increased effort to provide access to sustainable transportation systems in consideration of even those vulnerable, such as the elderly, people with disabilities, and children, among traffic participants. In order to achieve this goal, research and development efforts are made for further improvement in traffic safety and convenience through development related to comfortability in a vehicle.

For example, Japanese Patent Laid-Open No. 2021-047501 discloses a configuration in which a meeting facility is provided in a mobile body and a user in the mobile body can conduct a meeting using communication.

When a user participates in a meeting during movement of a mobile body, and the movement of the mobile body is completed before the meeting is over, the user needs to remain in the mobile body even after the movement is completed. In such a case, it is necessary to secure a place to store the mobile body, and this poses a burden on the user.

The present invention has been made in view of the above-stated circumstances and aims at reducing the burden on a user when the user boards a mobile body and participates in a meeting.

SUMMARY OF THE INVENTION

One aspect of the present invention relates to a notification device, including: an acquisition unit that acquires a destination to which a mobile body moves and an estimated arrival time of the mobile body arriving at the destination; a meeting determination unit that determines whether or not a user boarding the mobile body participates in an electronic meeting during movement of the mobile body; a notification unit that performs notification to the user and outputs information to an external device that performs processing related to the electronic meeting; and a notification control unit that compares, when the user participates in the electronic meeting during movement of the mobile body, a scheduled end time of the electronic meeting with the estimated arrival time, and controls the notification unit to execute notification based on a comparison result.

Advantageous Effects of Invention

One aspect of the present invention can notify the user of the correspondence between an electronic meeting in which a user boarding a mobile body participates and a moving time of the mobile body, so that the burden of the user can be reduced.

DETAILED DESCRIPTION OF THE PREFERRED EMBODIMENTS

[1. Configuration of Notification Device]

Figure 1:
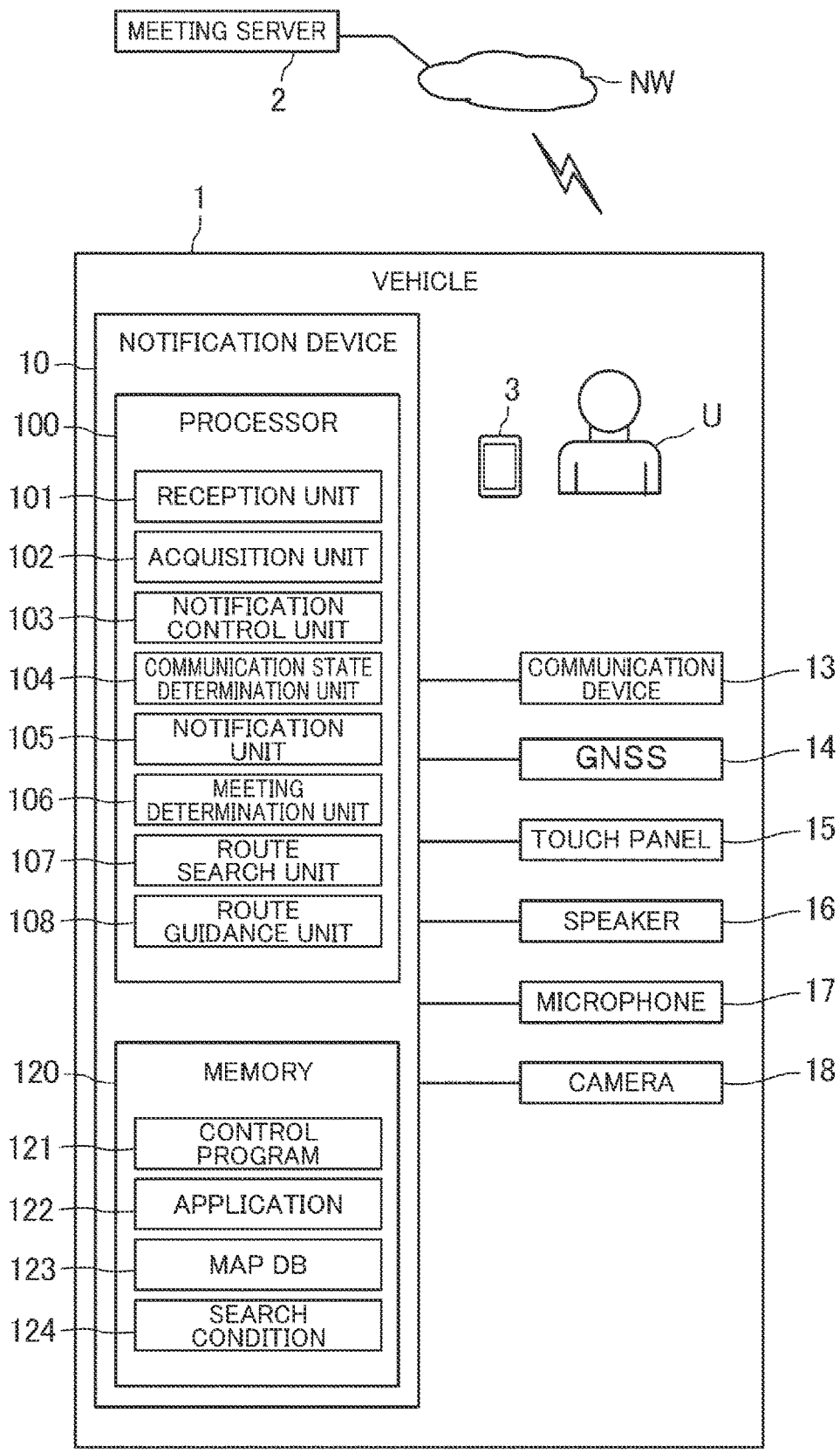
FIG. 1 shows a configuration example of a notification device.

FIG. 1 shows a configuration example of a notification device 10 mounted on a vehicle 1.

The notification device 10 is a device that notifies, when a user U participates in an electronic meeting while boarding the vehicle 1, information about the moving time of the vehicle 1 and the time of conducting the electronic meeting to the user U.

The vehicle 1 is an example of "mobile body". The vehicle 1 may include a cabin (a compartment) for the user U to board. The "mobile body" is not limited to a four-wheel vehicle and may be a vehicle with five or more wheels or a vehicle with three or less wheels. The vehicle as the "mobile body" may be a large vehicle such as buses, a commercial vehicle, or a work vehicle. The mobile body may also be a land mobile body such as automobiles, as well as a marine mobile body such as ships and submersibles, an aircraft including an electric vertical take-off and landing aircraft (eVTOL), an aerial mobile body such as airships, or a space mobile body such as space crafts and satellites.

The user U is the person boarding the vehicle 1 and participates in an electronic meeting while boarding the vehicle 1. The user U may be a driver steering the vehicle 1 or an occupant riding on the vehicle 1 steered by a person other than the user U. FIG. 1 shows a user terminal 3 used by the user U. The user terminal 3 is a smartphone, a tablet computer, or a computer of other forms, and includes a wireless communication device having at least one of the function to communicate with the notification device 10 and the function to communicate with a meeting server 2.

The vehicle 1 is connected to the meeting server 2 via a communication network NW. The communication network NW is a communication network constituted of, for example, a public line network, a dedicated line, or other communication circuits.

The meeting server 2 is a computer that executes an electronic meeting in which a plurality of users including the user U participate. The electronic meeting, also called an online meeting, is a meeting that is executed by meeting participants using computers (hereinafter referred to as participant terminals) to share voices and information through the communication network NW. The meeting server 2 receives voice data from the participant terminal of a user who is a meeting participant and transmits the received voice data to other participant terminals. The meeting server 2 also receives image data from the participant terminal and transmits the received image data to other participant terminals.

When there is a previously scheduled meeting, the meeting server 2 stores a scheduled start time and a scheduled end time of the meeting and information about the participants of the meeting. The meeting server 2 accepts participation in the electronic meeting through the participant terminals in response to access from the participant terminals which are stored as the information about the participants of the meeting.

In the following description, the scheduled end time of the electronic meeting may include the scheduled time when the electronic meeting, which is held using the meeting server 2, is ended and the scheduled time when participation of the user U in the electronic meeting is ended. Specifically, when the user U is scheduled to leave the electronic meeting prematurely, the scheduled end time for the user U is the time when the user U ends participation in the electronic meeting. In this case, the electronic meeting may continue even after the scheduled end time has passed.

The notification device 10 is a device mounted on the vehicle 1 and is also a computer including a processor 100 described later. The notification device 10 may be fixed to the vehicle 1, and may be a portable device that is temporarily provided in the vehicle 1. For example, the notification device 10 is a smartphone, a tablet computer, a personal computer of other formats, a car navigation device, or a display audio device.

[2. Configuration of Notification Device]

The notification device 10 is connected to a communication device 13, a global navigation satellite system (GNSS) 14, a touch panel 15, a speaker 16, a microphone 17, and a camera 18. These devices may be incorporated in the notification device 10.

The communication device 13 is a wireless communication device including a transmitter that transmits data and a receiver that receives data, and performs cellular communication. The communication device 13 connects to the communication network NW under the control of the processor 100 and executes data communication with the meeting server 2 through the communication network NW. The communication device 13 may execute wireless communication with the user terminal 3 directly or through the communication network NW. The communication device 13 may be configured to directly communicate with the user terminal 3 by Bluetooth (registered trademark), Wi-Fi (registered trademark), or other short-range wireless communication schemes.

The GNSS 14 detects the position of the vehicle 1 by receiving signals from satellites, generates the position information on the vehicle 1, and outputs the position information to the notification device 10.

The touch panel 15 includes a display screen constituted of a liquid crystal display panel or an organic electro luminescence (EL) panel and a touch sensor arranged so as to be superimposed on the display screen. The touch panel 15 displays text and images on the display screen based on a display signal or digital display data output by the notification device 10. The touch panel 15 detects a touch operation on the display screen by the user U, specifies an operation position of the detected touch operation, and outputs data indicating the specified operation position to the notification device 10.

The speaker 16 outputs sound based on a voice signal or digital voice data output by the notification device 10. The microphone 17 collects sound and outputs a voice signal of the collected sound or digital voice data to the notification device 10. The camera 18, which is a digital camera that executes photographing under the control of the notification device 10, outputs photographed image data to the notification device 10. Two or more speakers 16, the microphones 17 and cameras 18 may be provided in the cabin of the vehicle 1.

The notification device 10 includes the processor 100 and a memory 120. The processor 100 is a computer constituted of a central processing unit (CPU), a micro processing unit (MPU), or other integrated circuits. The memory 120 is a storage device that stores programs and data. The processor 100 may use a volatile random access memory (RAM) as a work area. The RAM may be integrated into and mounted on the processor 100 or the memory 120 may be configured with the RAM.

The memory 120 is a rewritable nonvolatile storage device that stores programs executed by the processor 100, and data processed by the processor 100. The memory 120 is constituted of, for example, a semiconductor storage device, such as flash read only memories (ROMs) or solid state disks (SSDs), or a magnetic storage device.

The memory 120 stores a control program 121, application 122, and a search condition 124. In the storage area of the memory 120, a map database (DB) 123 is provided. The map DB 123 stores map data that can be used for rout search, route guidance, and other purposes.

The control program 121 and the application 122 are programs executed by the processor 100 and are stored in the memory 120 so as to be readable by the processor 100. The control program 121 is a basic control program, that is, an operating system (OS), for the processor 100 to control each unit of the notification device 10. The application 122 is an application program executed on the OS.

The processor 100 includes, as function units, a reception unit 101, an acquisition unit 102, a notification control unit 103, a communication state determination unit 104, a notification unit 105, a meeting determination unit 106, a route search unit 107, and a route guidance unit 108. These function units are implemented by the processor 100 executing the application 122. The application 122 is an example of "program".

The reception unit 101 accepts input operation performed by a person boarding the vehicle 1. The reception unit 101 accepts, for example, the content input by touch operation on the touch panel 15. The reception unit 101 may accept input operation based on the data that the communication device 13 receives from the user terminal 3.

The acquisition unit 102 acquires information about movement of the vehicle 1. The acquisition unit 102 acquires information about the meeting in which the user U participates. Specifically, the acquisition unit 102 acquires a destination to which the vehicle 1 moves and an estimated arrival time of the vehicle 1 arriving at the destination based on the input received by the reception unit 101 or on preset information. The acquisition unit 102 also accesses the meeting server 2 through the communication device 13 and acquires from the meeting server 2 information about the meeting in which the user U participates. For example, the acquisition unit 102 may acquire a scheduled end time of the meeting or a scheduled start time of the meeting from the meeting server 2. In this case, the acquisition unit 102 specifies the meeting in which the user U participates in accordance with the input of the user U accepted by the reception unit 101, and requests information about the specified meeting to the meeting server 2.

The communication state determination unit 104 that determines the communication state of wireless communication to be used by the user U to participate in the electronic meeting. When the user U participates in an electronic meeting using the speaker 16, the microphone 17, and the camera 18 of the notification device 10, the communication state determination unit 104 determines the communication state by the communication device 13. When the user U participates in an electronic meeting using the user terminal 3, the communication state determination unit 104 determines the communication state of the communication performed by the user terminal 3.

The communication state to be determined by the communication state determination unit 104 refers to the state of wireless communication executed by the communication device 13 or the user terminal 3. For example, the communication state includes communication speed, the magnitude of delay, and received radio wave strength.

The methods for the communication state determination unit 104 to determine the communication state includes a method of collating data stored in the memory 120 with the position of the vehicle 1, and a method of obtaining an indicator of an actual communication state using the communication device 13.

The method of collating the data stored in the memory 120 with the position of the vehicle 1 uses map data stored in the map DB 123. The map data stored in the map DB 123 includes coordinates including latitude and longitude, which are associated with facility data related to buildings and parking places, road data related to roads, or other data. The map data in the present embodiment includes indicators of the communication states of wireless communication, which are associated with the coordinates. In other words, the map data includes information indicating the communication state for each coordinate or for each area of a predetermined size. Based on the position information generated by the GNSS 14, the communication state determination unit 104 acquires map data including the position of the vehicle 1 from the map DB 123. The communication state determination unit 104 acquires an indicator of the communication state of wireless communication in the acquired map data. The communication state determination unit 104 determines whether the communication state is good or not by determining whether the acquired indicator is better than a preset standard.

In the case of adopting the method of obtaining the indicator of the actual communication state using the communication device 13, the communication state determination unit 104 calculates the indicator of the communication state by, for example, making the communication device 13 execute cellular communication and measuring the communication speed and the magnitude of delay. The communication state determination unit 104 also calculates the indicator of the communication state by making the communication device 13 execute communication in conformity with a bandwidth and a communication scheme used for communication by the user terminal 3 and measuring the communication speed and the magnitude of delay. The communication state determination unit 104 determines whether the communication state is good or not by determining whether the calculated indicator of the communication state is better than the preset standard.

The notification unit 105 executes notification. The notification executed by the notification unit 105 is a direct notification to the user U. Specifically, the notification unit 105 may execute notification by displaying a notification screen on the touch panel 15 and outputting notification voice from the speaker 16. The notification unit 105 may also execute notification by outputting information to an external device that is other than the notification device 10. Specifically, the notification unit 105 may execute notification by transmitting to the user terminal 3 the content of notification to the user U. In this case, the user terminal 3 corresponds to an example of "external device".

The meeting determination unit 106 determines whether or not the user U boarding the mobile body 1 participates in an electronic meeting during movement of the mobile body 1. The meeting determination unit 106 compares, for example, a scheduled start time and a scheduled end time of the meeting, which are acquired by the acquisition unit 102 from the meeting server 2, with current time to determine whether or not the electronic meeting is conducted during movement of the vehicle 1. The meeting determination unit 106 may also determine whether or not the user U participates in the electronic meeting during movement of the mobile body 1 based on the input of the user U accepted by the reception unit 101.

The route search unit 107 and the route guidance unit 108 have the function of a so-called car navigation device that provides a moving route guidance for the vehicle 1 while the vehicle 1 is moving. The route search unit 107 searches for a moving route of the vehicle 1 based on the destination of the vehicle 1 acquired by the acquisition unit 102 and the position information on the vehicle 1 generated by the GNSS 14. The route search unit 107 refers to the map data in the map DB 123 in the search for the moving route.

The search condition 124 stored in the memory 120 includes conditions when the route search unit 107 searches for the moving route. For example, the search condition 124 includes conditions for specifying whether or not to use toll roads, whether or not to preferentially use highways, and the like. The route search unit 107 generates a moving route of the vehicle 1 by searching for the route that satisfies the conditions of the search condition 124 and that allows arrival at the destination in a shortest time. When searching for a moving route, the route search unit 107 calculates an estimated arrival time of the vehicle 1 arriving at the destination and a moving time required for the vehicle 1 to move.

To move the vehicle 1 along the moving route generated by the route search unit 107, the route guidance unit 108 executes guidance for the driver of the vehicle 1. The route guidance unit 108 displays a map including the position of the vehicle 1 on the touch panel 15, and displays an image in which the position of the vehicle 1 and the moving route are overlapped on the map. The route guidance unit 108 outputs voice to guide an advancing direction of the vehicle 1 from the speaker 16 and displays an image for guiding the advancing direction of the vehicle 1 on the touch panel 15. For example, the route guidance unit 108 acquires position information on the vehicle 1 from the GNSS 14, determines the advancing direction of the vehicle 1 based on the moving route generated by the route search unit 107 and on the position information on the vehicle 1, and provides the driver with guidance of an operation to advance the vehicle 1 in a determined direction.

When the user U participates in an electronic meeting during movement of the vehicle 1, the notification control unit 103 controls the notification unit 105 to execute notification to the user U in accordance with a moving state of the vehicle 1 and an execution state of the electronic meeting. For example, the notification control unit 103 compares the scheduled end time of the electronic meeting with the estimated arrival time, and controls the notification unit to execute notification based on the comparison result. The notification control unit 103 compares, when the user U participates in the electronic meeting during movement of the mobile body 1, a moving time required for the mobile body 1 to move to the destination with a meeting time during which the electronic meeting is conducted, and controls the notification unit to execute notification when the meeting time is shorter than the moving time.

More specifically, when the estimated arrival time is earlier than the scheduled end time of the electronic meeting, the notification control unit 103 controls the notification unit 105 to execute notification.

For example, when the user U is a steerer (also referred to as a driver) who steers the vehicle 1, the user U participates in an electronic meeting while steering the vehicle 1. The user U can participate in the electronic meeting in a so-called hands-free state by using the 16 speaker, the microphones 17, and the camera 18 included in the vehicle 1 without operating the touch panel 15 or the user terminal 3. Assuming that vehicle 1 is a mobile body having the function of autonomous steering, the user U can concentrate on the electronic meeting while the vehicle 1 is moving autonomously.

Incidentally, for autonomous movement of mobile bodies, Level 1 and Level 2 automated driving using advanced driver-assistance systems (ADAS) has been put to practical use. When the vehicle 1 executes Level 1 or Level 2 automated driving, the driver needs to take the initiative in driving operation of the vehicle 1. When the vehicle 1 performs Level 3 automated driving, the driver does not need to perform driving operation while the vehicle 1 is traveling steadily. However, when the automated driving system requires driving operation, the driver is required to perform driving operation of the vehicle 1. For example, while the vehicle 1 is traveling on a road with sufficient width, such as highways or main roads, the vehicle 1 can travel autonomously. In this case, the driver may be required to perform driving operation while the vehicle 1 is driven to a parking position after the vehicle 1 has arrived at the vicinity of the destination, and when the vehicle 1 is parked. In the case where the driver of the vehicle 1 needs to determine the place to park the vehicle 1, the driver needs to drive the vehicle 1 while searching for the parking place.

Thus, in the case where the user U is the driver of the vehicle 1, the situation where the user U needs to concentrate on the driving operation of the vehicle 1 may occur even when the vehicle 1 can perform autonomous travel corresponding to Levels 1, 2, and 3. In addition, when the vehicle 1 is parked or stopped while an electronic meeting is conducted, the user U needs to continuously participate in the electronic meeting in the parked or stopped vehicle 1.

Meanwhile, in the case where the vehicle 1 continues to move while the electronic meeting is taking place, and the vehicle 1 parks or stops after the electronic meeting is over, the above issue does not occur.

Accordingly, the notification control unit 103 performs notification to the user U when the vehicle 1 is estimated to arrive at the destination before the electronic meeting in which the user U participate is ended. The notification to the user U is preferably performed before the vehicle 1 stats to move, and may be performed after the vehicle 1 starts to move.

Moreover, the notification control unit 103 controls the route search unit 107 that searches for a moving route of the mobile body 1 to search for a first moving route to the destination based on a prescribed search condition. The first moving route is, for example, a moving route of the vehicle 1 searched and generated by the route search unit 107 based on the search condition 124. When the estimated arrival time in the case of moving along the first moving route is earlier than the scheduled end time of the electronic meeting, the notification control unit 103 controls the route search unit 107 to search for a second moving route along which the mobile body 1 arrives at the destination at the time that is later than the scheduled end time of the electronic meeting. The second moving route is a moving route of the vehicle 1 searched and generated by the route search unit 107 on the condition that the mobile body 1 arrives at the destination at the time later than the scheduled end time of the electronic meeting, in addition to the search condition 124. The notification control unit 103 controls the route search unit 107 to search for the second moving route, and then controls the notification unit 105 to perform notification related to the second moving route.

When the user U participates in an electronic meeting during movement of the vehicle 1, it is desirable that the state of communication used for the electronic meeting is good. When the user U participates in the electronic meeting, the communication device 13 or the user terminal 3 transmits and receives voice data and image data using the communication network NW. When the communication state of the communication is poor, participation in the electronic meeting is compromised When video obtained by photographing the user U is used in the electronic meeting in particular, a good communication state is more important because the video involves a large amount of data communication.

When the communication state determination unit 104 determines that the communication state in the moving route of the vehicle 1 is poor, the notification control unit 103 controls the route search unit 107 to search for a third moving route better in communication state of the wireless communication. For example, when the vehicle 1 moves along the first moving route and the communication state in the first moving route is determined to be poor, the notification control unit 103 controls the route search unit 107 to search for the third moving route better in communication state of the wireless communication. Similarly, when the vehicle 1 moves along the second moving route and the communication state is determined to be poor, the notification control unit 103 controls the route search unit 107 to search for the third moving route better in communication state of the wireless communication. The third moving route is a moving route searched and generated by the route search unit 107 based on the condition of passing an area or a road where the communication state of the communication device 13 or the user terminal 3 is equal to or more than a prescribed standard, in addition to the search condition 124.

When the notification control unit 103 controls the route search unit 107 to generate the third moving route, the notification control unit 103 controls the notification unit 105 to execute notification related to the third moving route. Here, the notification control unit 103 may request the user U to select whether or not to move the vehicle 1 along the third moving route. Even when the reception unit 101 accepts the input indicating that the user U does not use the third moving route, the notification control unit 103 may control the notification unit 105 to notify the determination result of the communication state determination unit 104.

Most of these various issues described above can be solved when there is a parking place or a facility available for parking the vehicle 1*t* in a location with a good communication state at or in the vicinity of the destination of the vehicle 1. In this case, even when the vehicle 1 arrives at the destination before the scheduled end time of the electronic meeting, the user U can safely and comfortably participate in the electronic meeting in the parked vehicle 1. Therefore, when there is a parking place good in communication state at or in the vicinity of the destination of the vehicle 1, the notification control unit 103 does not need to control the notification unit 105 to notify the relation between the scheduled end time of the meeting and the estimated arrival time, or the like. In other words, the notification control unit 103 determines whether or not to perform notification by the notification unit 105, based on the presence or absence of the place available for storing the mobile body 1 in an area including the destination of the vehicle 1 and based on the communication state of the wireless communication used by the user U to participate in the electronic meeting in the area.

[3. Operation of Notification Device]

Description is now given of the operation of the notification device 10.

Figure 2:
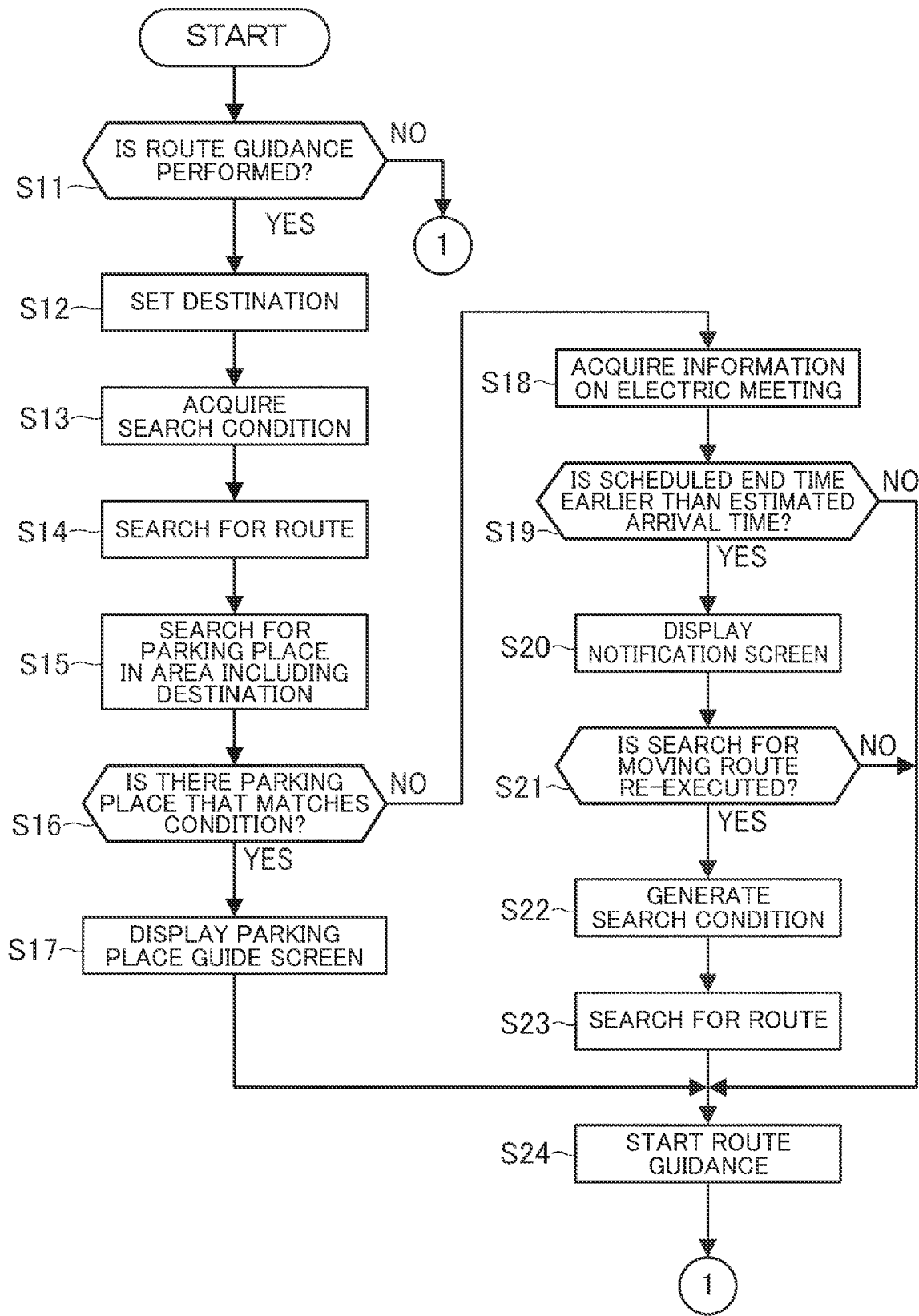
FIG. 2 is a flowchart showing an operation example of the notification device.
Figure 3:
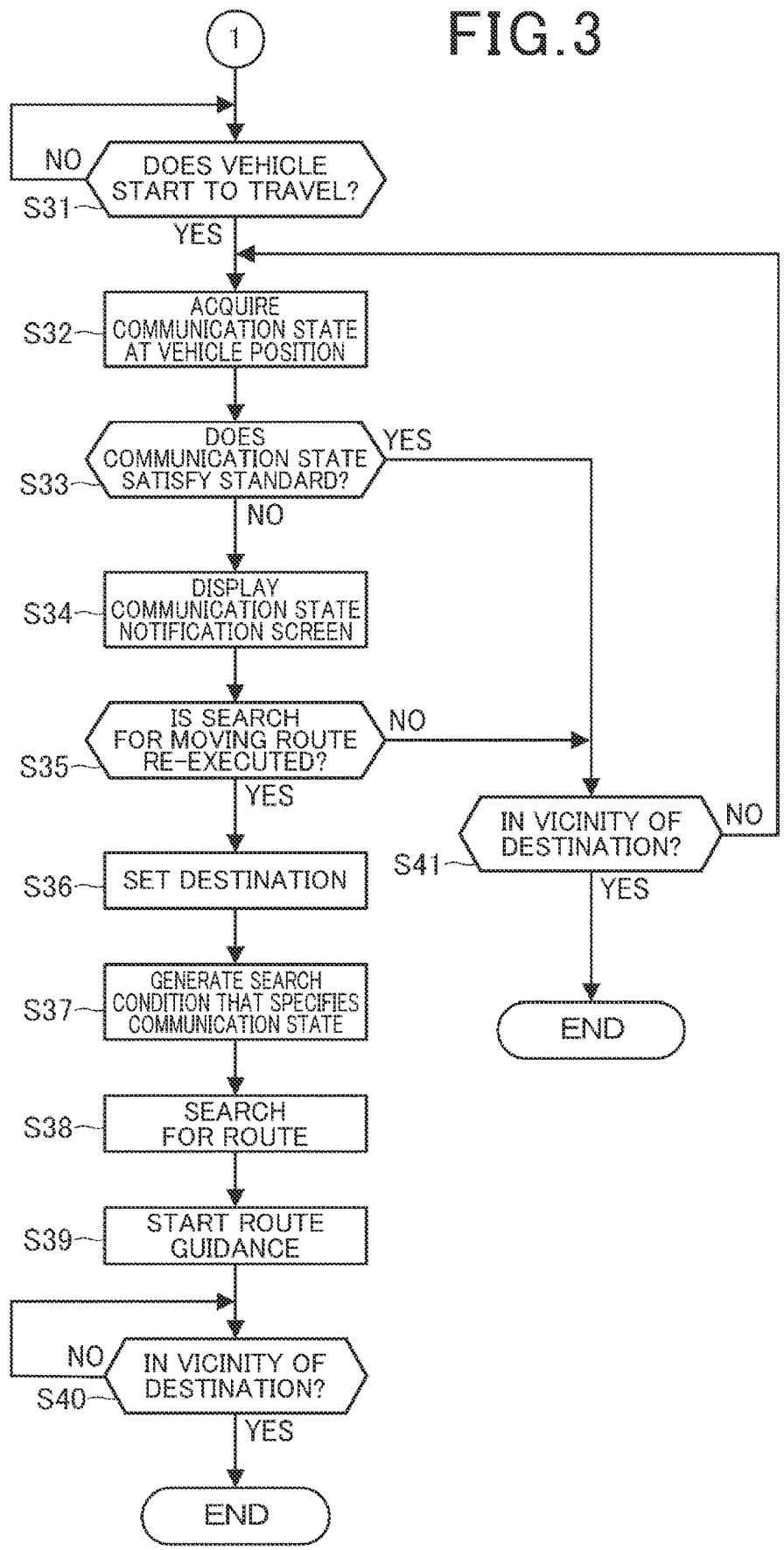
FIG. 3 is a flowchart showing an operation example of the notification device.
Figure 4:
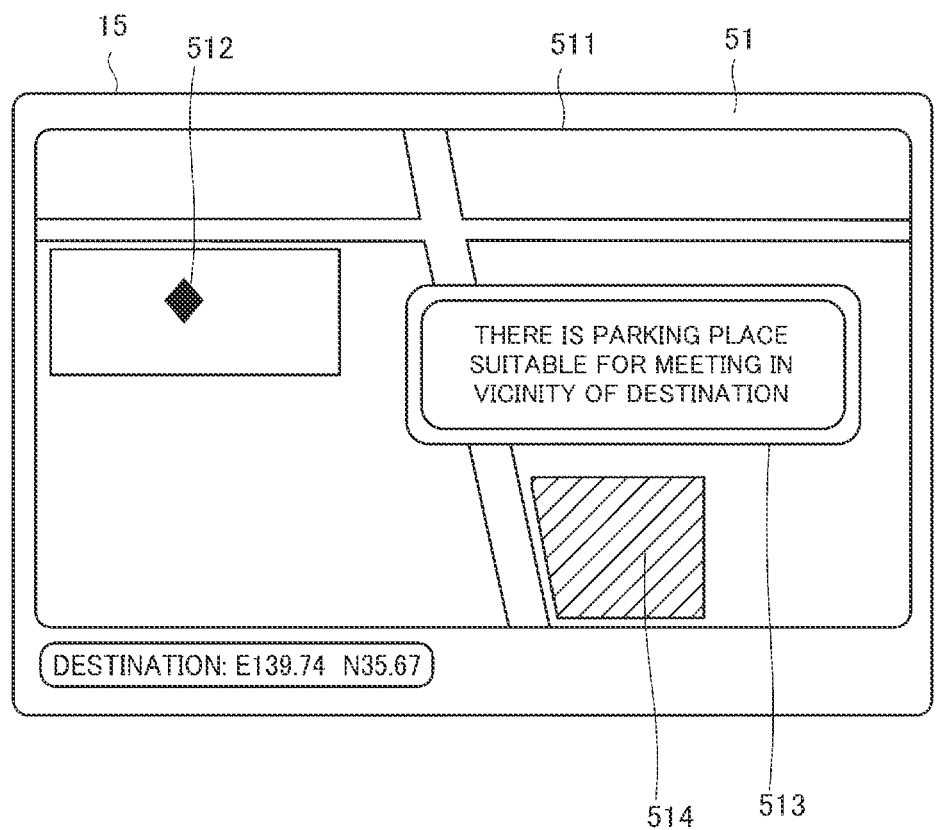
FIG. 4 shows an example of a parking place guide screen.
Figure 5:
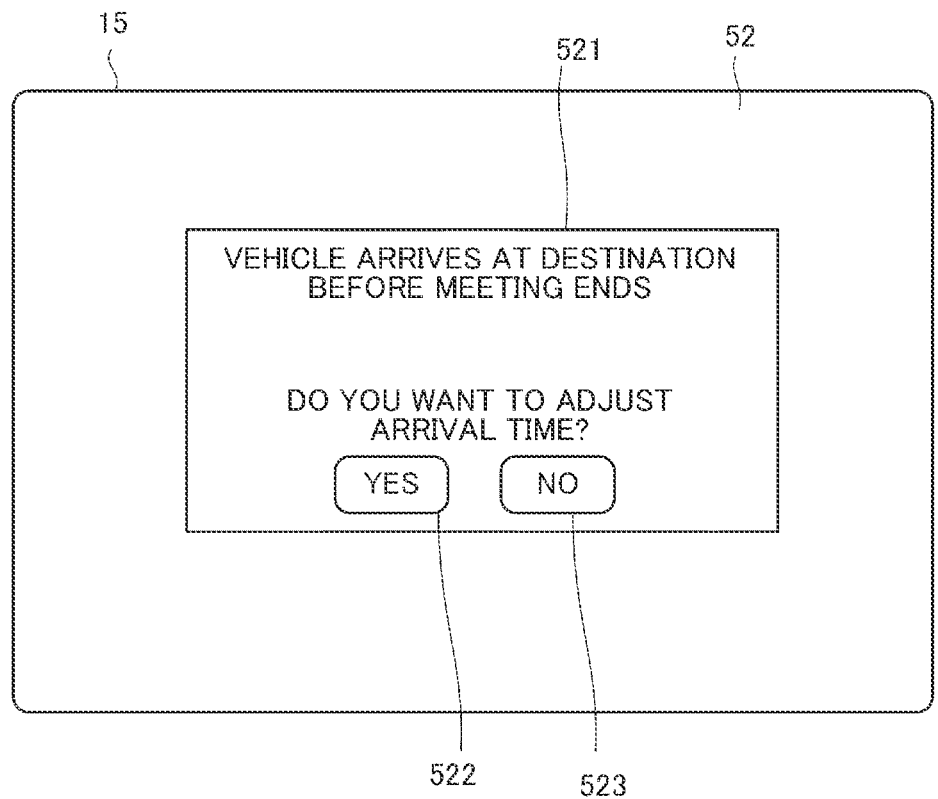
FIG. 5 shows an example of a notification screen.
Figure 6:
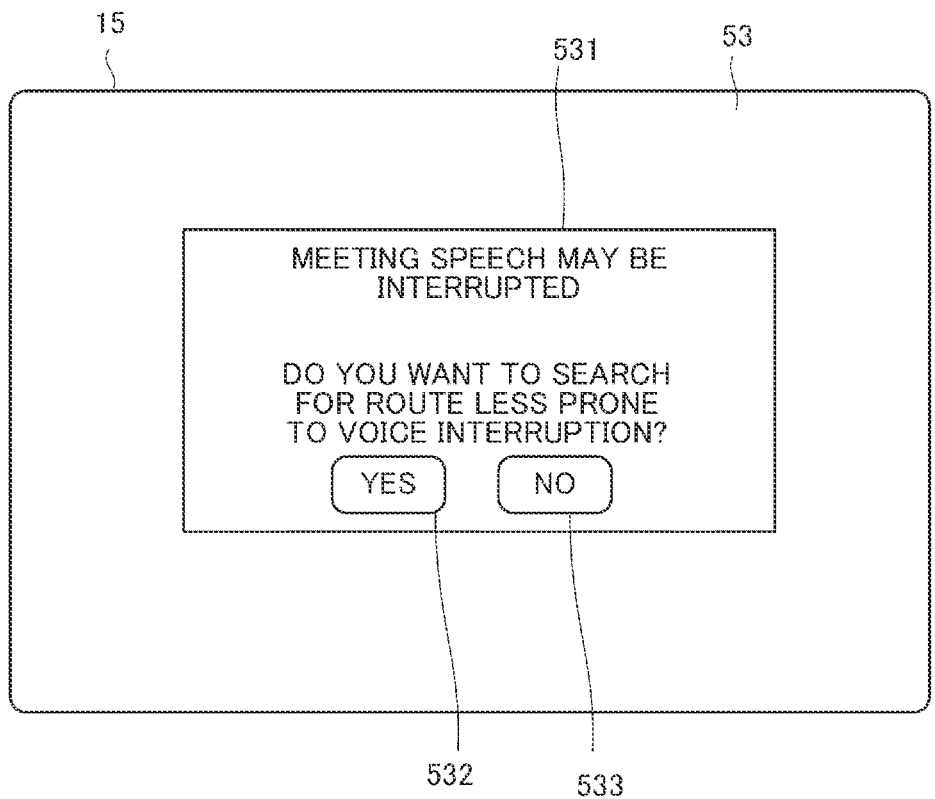
FIG. 6 shows an example of a communication state notification screen.

FIGS. 2 and 3 are flowcharts showing the operation of the notification device 10. FIGS. 4, 5, and 6 show examples of the screen displayed under the control of the notification device 10. FIG. 4 shows an example of a parking place guide screen 51, FIG. 5 shows an example of a notification screen 52, and FIG. 6 shows an example of a communication state notification screen 53.

Of the operations shown in FIGS. 2 and 3, the acquisition unit 102 executes steps S12 and S18, and the communication state determination unit 104 executes steps S32 and S33, and the notification unit 105 executes steps S17 and S20. The route search unit 107 execute steps S13, S14, S23, S38, and the route guidance unit 108 executes steps S24, S39, and S40. The notification control unit 103 executes steps S11-S16, S19-S22, S31, S34-S37, and S41.

When the meeting determination unit 106 determines whether or not the user U participates in an electronic meeting, and when the user U participates in the electronic meeting, the notification device 10 starts the operation of FIG. 2. The determination by the meeting determination unit 106 may be made before the vehicle 1 starts to move or while the vehicle 1 is moving.

The notification device 10 determines whether or not to perform route guidance of the vehicle 1 (step S11). For example, the notification device 10 displays a screen for requesting input of whether or not to perform route guidance on the touch panel 15, and performs determination of step S11 based on the input of the user U into the screen. When the route guidance is not performed (step S11: NO), the notification device 10 shifts to step S31 (FIG. 3) described later.

When the route guidance is performed (step S11; YES), the notification device 10 acquires the destination of the vehicle 1 and sets it as a route search condition (step S12). The notification device 10 further acquires the search condition 124 stored in the memory 120 (step S13), and performs route search based on the search condition 124 and the destination set in step S12 (step S14). As a result, the moving route of the vehicle 1 is generated. The moving route generated in step S14 corresponds to an example of "first moving route".

The notification device 10 searches for a parking place that matches a condition in an area of a prescribed size including the set destination (step S15). The condition of the parking place includes that the vehicle 1 can be parked and that the communication state of the wireless communication satisfies the standard. In step S15, the notification device 10 acquires map data including the destination and map data within a predetermined distance from the destination, from the map DB 123. The notification device 10 searches for a parking space available for parking the vehicle 1 based on facility data included in the acquired map data. The notification device 10 further determines whether or not the communication state of the wireless communication in the parking place found by the search satisfies the preset standard. The communication state of the wireless communication can be determined based on, for example, the indicator of the communication state of the wireless communication included in the map data and the position information on the parking place.

The notification device 10 determines the presence or absence of the parking place that matches the condition (step S16). When the parking place that matches the condition is present (step S16; YES), the notification device 10 displays the parking place guide screen on the touch panel 15 (step S17), and shifts to step S24 described later.

FIG. 4 shows an example of the parking place guide screen 51. On the parking place guide screen 51, a map 511 is arranged to guide the position of the parking place. On the map 511, a destination icon 512 showing the position of the destination and a guide image 514 indicating the position of the parking place are arranged. The map 511 is also overlaid with a notification message 513. The notification message 513 includes a message notifying the user U that the parking place suitable for participating in an electronic meeting is present in the vicinity of the destination.

On the other hand, when the parking place that matches the conditions is not present (step S16; NO), the notification device 10 acquires information on the electronic meeting (step S18). The information acquired by the notification device 10 in step S18 includes a scheduled end time of the electronic meeting. The notification device 10 determines whether or not the scheduled end time of the electronic meeting acquired in step S18 is earlier than the estimated arrival time in the moving route searched in step S14 (step S19).

When determining that the scheduled end time of the electronic meeting is not earlier than the estimated arrival time (step S19; NO), the notification device 10 shifts to step S24. When determining that the scheduled end time of the electronic meeting is earlier than the estimated arrival time in the moving route searched in step S14 (step S19: YES), the notification device 10 displays the notification screen on the touch panel 15.

FIG. 5 shows an example of the notification screen 52. On the notification screen 52, a notification message 521 is arranged. The notification message 521 includes a message notifying the user U that the vehicle 1 arrives at the destination before the end of the electronic meeting. The notification message 521 also includes a message requesting the user U to input whether or not to adjust the arrival time, and selection parts 522 and 523 are arranged in the position corresponding to the message. The selection parts 522 and 523 are buttons to prompt the user U to perform touch operation. The selection part 522 functions as a button to input instruction for adjusting the arrival time, and the selection part 523 functions as a button to input instruction for not adjusting the arrival time. Adjusting the arrival time refers to searching for a new moving route for the vehicle 1. The moving route is searched by the route search unit 107 on the condition that the estimated arrival time of the vehicle 1 arriving at the destination is later than the scheduled end time of the electronic meeting, and the moving route corresponds to an example of "second moving route".

After displaying the notification screen 52 (step S20), the notification device 10 determines whether or not to re-execute search for a moving route for the vehicle 1 based on the input of the user U (step S21). For example, the notification device 10 determines to re-execute search for a moving route when the selection part 522 is operated, and the notification device 10 determines not to re-execute search for a moving route when the selection part 523 is operated.

When determining not to re-execute search for a moving route (step S21; NO), the notification device 10 shifts to step S24. When determining to re-execute search for a moving route (step S21; YES), the notification device 10 generate a search condition (step S22). The search condition generated in step S22 includes, in addition to the search condition 124, the condition that the estimated arrival time of the vehicle 1 arriving at the destination is later than the scheduled end time of the electronic meeting acquired in step S18.

Based on the search condition set in step S22, the notification device 10 searches for the moving route of the vehicle 1 to the destination (step S23), and shifts to step S24.

In step S24, the notification device 10 starts guidance for the driver of the vehicle 1 based on the moving route of the vehicle 1 (step S24), and shifts to step S31 (FIG. 3).

In step S31, the notification device 10 determines whether or not the vehicle 1 starts to travel (step S31), and when the vehicle 1 does not start to travel (step S31; NO), the notification device 10 waits. When the vehicle 1 starts to travel (step S31; YES), the notification device 10 acquires the communication state of the wireless communication at the position of the vehicle 1 (step S32). In step S32, the notification device 10 acquires the position information output by the GNSS 14, acquires the map data including the acquired position information from the map DB 123, and acquires an indicator for the communication state included in the acquired map data. The notification device 10 determines whether or not the acquired indicator of the communication state satisfies the preset standard. The indicator of the communication state satisfying the standard corresponds to the communication state being good.

When the indicator of the communication state satisfies the standard (step S33; YES), the notification device 10 determines whether or not the vehicle 1 reaches the vicinity of the destination (step S41). In step S41, the notification device 10 calculates, for example, the distance between the position of the vehicle 1 and the destination, and when the calculated distance is equal to or less than a threshold, the notification device 10 determines that the vehicle 1 reaches the vicinity of the destination.

When determining that the vehicle 1 reaches the vicinity of the destination (step S41; YES), the notification device 10 ends the present processing. When determining that the vehicle 1 does not reach the vicinity of the destination (step S41; NO), the notification device 10 returns to step S32 and repeats the operation of step S32 at a predetermined time interval.

When the indicator of the communication state does not satisfy the standard (step S33; NO), the notification device 10 displays the communication state notification screen 53 on the touch panel 15 (step S34).

FIG. 6 shows an example of the communication state notification screen 53. On the communication state notification screen 53, a notification message 531 is arranged. The notification message 531 is a message to inform the user U that the vehicle 1 may move through the place where the communication state is poor. In the example in FIG. 6, the notification is sent to the user U with an expression that the speech in electronic meeting may be interrupted. The notification message 531 includes a message for requesting the user U to input whether or not to search for a moving route to move to the place where the communication state is good. The example in FIG. 6 adopts the expression of requesting the input of whether or not to search for a moving route less prone to interruption of speech in the electronic meeting. Selection parts 532 and 533 are arranged in the position corresponding to this message. The selection parts 532 and 533 are buttons to prompt the user U to perform touch operation. The selection part 532 serves as a button to input instruction to search for a moving route less prone to interruption of speech in the electronic meeting. The selection part 533 serves as a button to input instruction not to search for a moving route less prone to interruption of speech in the electronic meeting. The moving route less prone to interruption in speech in the electronic meeting is searched by the route search unit 107 on the condition that the communication state at the place where the vehicle 1 passes satisfies the standard, and the moving route corresponds to an example of "third moving route".

After displaying the communication state notification screen 53 (step S34), the notification device 10 determines whether or not to re-execute search for a moving route for the vehicle 1 based on the input of the user U (step S35). For example, the notification device 10 determines to re-execute search for a moving route when the selection part 532 is operated, and the notification device 10 determines not to re-execute search for a moving route when the selection part 533 is operated.

When determining not to re-execute search for a moving route (step S35; NO), the notification device 10 shifts to step S41. When determining to re-execute search for the moving route (step S35; YES), the notification device 10 sets the determination of the vehicle 1 (step S36), and shifts to step S37. The operation of step S36 is similar to that of step S12. When the destination is set in step S12, the notification device 10 skips step S36.

In step S37, the notification device 10 generates a search condition (step S37). The search condition generated in step S37 includes a condition that the communication state at the place where the vehicle 1 passes satisfies the standard in addition to the search condition 124.

Based on the search condition set in step S37, the notification device 10 searches for a moving route of the vehicle 1 to the destination (step S38). Next, the notification device 10 starts guidance for the driver of the vehicle 1 based on the moving route of the vehicle 1 searched in step S38 (step S39), and shifts to step S40.

In step S40, the notification device 10 determines whether or not the vehicle 1 reaches the vicinity of the destination (step S40). Determination in step S40 is performed as in the case of step S41, for example. When determining that the vehicle 1 reaches the vicinity of the destination (step S40; YES), the notification device 10 ends the present processing. When determining that the vehicle 1 does not reach the vicinity of the destination (step S40; NO), the notification device 10 repeats the operation of step S40 at a predetermined time interval.

[4. Other Embodiments]

The embodiment described above shows only one aspect, and any deformations and applications are possible.

In the above embodiment, as an example of notification executed by the notification unit 105, the parking place guide screen 51, the notification screen 52, and the communication state notification screen 53 are displayed on the touch panel 15. As described above, the notification unit 105 can perform notification by outputting information to the user terminal 3 or other devices. For example, the notification unit 105 may transmit to the user terminal 3 data for displaying screens corresponding to the parking place guide screen 51, the notification screen 52, and the communication state notification screen 53.

In the embodiment described above, a configuration has been illustrated in which the notification device 10 acquires the scheduled end time of the electronic meeting from the meeting server 2 that performs processing related to the electronic meeting, though the notification device 10 may acquire the scheduled end time of the electronic meeting from another device. For example, the notification device 10 may acquire the scheduled end time from an unillustrated server computer having information about the schedule of the user U. In this case, the notification device 10 may acquire the information about the schedule of the user U from the above server computer, and the meeting determination unit 106 may determine whether or not the user U participates in the electronic meeting during movement of the mobile body 1 based on the acquired information.

In the embodiment described above, an example has been described in which the notification device 10 determines the input based on the touch operation on the touch panel 15 while the notification screen 52 is displayed and the communication state notification screen 53 is displayed. This is merely exemplary, and the user U may perform voice input using the microphone 17 while the notification screen 52 is displayed and the communication state notification screen 53 is displayed. In addition, a configuration may be adopted in which the notification device 10 may include an unillustrated sensor that detects a gesture operation of the user U, and in this case, the notification device 10 may accept input by detecting the gesture operation of the user U. For example, the input of the user U may be determined based on the motion of the hand of the user U while the notification screen 52 is displayed and the communication state notification screen 53 is displayed.

In the embodiment described above, a configuration has been described in which the notification device 10 can execute search for a route using the route search unit 107, though the configuration is merely exemplary. For example, the notification device 10 may be configured to be able to communicate with an unillustrated server computer having a route search function via the communication network NW. In this case, the notification device 10 may transmit data that requests a route search based on the search condition 124 to the server computer, the server computer generates a moving route of the vehicle 1, and the notification device 10 acquires the generated moving route. Similarly, the notification device 10 may request route search based on the search condition 124 plus other conditions. In such a configuration, the notification device 10 may not include the route search unit 107. The notification device 10 may not include the map DB 123.

The processor 100 may be constituted of a single processor or may be constituted of a plurality of processors. The processor 100 may be hardware programed to implement corresponding function units. Specifically, the processor 100 may be constituted of, for example, an application-specific integrated circuit (ASIC) or a field programmable gate array (FPGA).

Each unit of the vehicle 1 shown in FIG. 1 is exemplary, and specific implementations are not particularly limited. In other words, it is not necessarily needed to implement hardware corresponding individually to each unit, and it is of course possible to adopt the configuration where the function of each unit is implemented by one processor executing a program or programs. In the embodiment described above, some of the functions implemented by software may be implemented by hardware, or some of the functions implemented by hardware may be implemented by software. For other specific detailed configurations regarding each unit of the vehicle 1, any changes are possible.

The operations shown in FIGS. 2 and 3 are divided into step units according to the main processing contents for easy understanding of the operations, and the present invention is not limited by how the operations are divided into processing units or by the name thereof. Depending on the processing contents, the operations may be divided into more step units. The operations may also be divided so that one step unit may include more processings. The order of the steps may be switched as appropriate without compromising the scope of the present invention.

When a control method of the above-described notification device 10 is implemented by using the processor 100, the program to be executed by the processor 100 may be configured in the format of a non-transitory recording medium or a transmission medium that transmits the program. In other words, the application 122 can be implemented in the state where the application 122 is recorded on a portable information storage medium. Examples of the information recording medium include a magnetic recording medium such as hard disks, an optical recording medium such as CDs, and a semiconductor storage device such as universal serial bus (USB) memories and solid state drives (SSDs), though other recording media can also be used.

[5. Configurations Supported by Above Embodiment]

The embodiment disclosed supports the following configurations.

(Configuration 1) A notification device, including an acquisition unit that acquires a destination to which a mobile body moves and an estimated arrival time of the mobile body arriving at the destination; a meeting determination unit that determines whether or not a user boarding the mobile body participates in an electronic meeting during movement of the mobile body; a notification unit that performs notification to the user and outputs information to an external device that performs processing related to the electronic meeting; and a notification control unit that compares, when the user participates in the electronic meeting during movement of the mobile body, a scheduled end time of the electronic meeting with the estimated arrival time, and controls the notification unit to execute notification based on a comparison result.

The notification device in configuration 1 can notify the user of the correspondence between an electronic meeting in which a user boarding a mobile body participates and a moving time of the mobile body. This allows the user to take measures, such as adjusting the travel time of the mobile body, in the case where the electronic meeting may end during movement of the mobile body. Therefore, the user can concentrate on the meeting in the mobile body, so that the burden on the user can be reduced.

(Configuration 2) In the notification device according to the configuration 1, when the estimated arrival time is earlier than the scheduled end time of the electronic meeting, the notification control unit controls the notification unit to execute notification.

The notification device in configuration 2 performs notification to the user when the electronic meeting may end during movement of the mobile body, so that the user can take measures, such as adjusting the moving time of the mobile body. Therefore, the user can concentrate on the meeting in the mobile body, so that the burden on the user can be reduced.

(Configuration 3) In the notification device according to the configuration 2, the notification control unit controls a route search unit that searches for a moving route of the mobile body, to search for a first moving route to the destination based on a prescribed search condition, and when the estimated arrival time in a case of moving along the first moving route is earlier than the scheduled end time of the electronic meeting, the notification control unit controls the route search unit to search for a second moving route along which the mobile body arrives at the destination at time that is later than the scheduled end time of the electronic meeting, and controls the notification unit to perform notification related to the second moving route.

The notification device in the configuration 3 guides for the user the moving route that allows the mobile body to continuously move until the end of the electronic meeting. Therefore, the user can concentrate on the meeting in the mobile body, so that the burden on the user can be reduced.

(Configuration 4) The notification device according to the configuration 3, including a communication state determination unit that determines a communication state of wireless communication used by the user to participate in the electronic meeting, in which when it is determined that the communication state in the first moving route or the second moving route is poor, the notification control unit controls the route search unit to search for a third moving route better in the communication state of the wireless communication, and controls the notification unit to perform notification related to the third moving route.

The notification device in the configuration 4 can maintain the communication state of the wireless communication in a good state while the user is participating in an electronic conference. Therefore, the user can concentrate on the meeting in the mobile body, so that the burden on the user can be reduced.

(Configuration 5) The notification device according to the configuration 4, including a reception unit that accepts input of the user, in which even when the input indicating that the user does not use the third moving route is accepted, the notification control unit controls the notification unit to notify a determination result of the communication state determination unit.

The notification device in the configuration 5 performs notification related to the communication state of the wireless communication to the user even when the user does not select the moving route proposed by the notification device. This allows the user to acquire information about the communication state, without the concern for unintentional deterioration of the communication state. Therefore, the user can concentrate on the meeting in the mobile body, so that the burden on the user can be reduced.

(Configuration 6) The notification device according to any one of the configurations 1 to 5, in which the notification control unit determines whether or not to perform notification by the notification unit, based on presence or absence of a place available for storing the mobile body in an area including the destination and based on a communication state of wireless communication used by the user to participate in the electronic meeting in the area.

The notification device in the configuration 6 can restrain notification when the user can participate in an electronic meeting while storing the mobile body at or in the vicinity of the destination of the mobile body. Therefore, the user can concentrate on the meeting in the mobile body, so that the burden on the user can be reduced.

(Configuration 7) A notification device, including: a meeting determination unit that determines whether or not a user boarding a mobile body participates in an electronic meeting during movement of the mobile body; a notification unit that performs notification to the user and outputs information to an external device that performs processing related to the electronic meeting; and a notification control unit that compares, when the user participates in the electronic meeting during movement of the mobile body, a moving time required for the mobile body to move to a destination with a meeting time during which the electronic meeting is conducted, and controls the notification unit to execute notification when the meeting time is shorter than the moving time.

The notification device in the configuration 7 performs notification to the user boarding the mobile body when the electronic meeting in which the user participates may end during movement of the mobile body. This allows the user to take measures, such as adjusting the moving time of the mobile body. Therefore, the user can concentrate on the meeting in the mobile body, so that the burden on the user can be reduced.

(Configuration 8) A notification method executed by a computer, comprising: acquiring a destination to which a mobile body moves and an estimated arrival time of the mobile body arriving at the destination; determining whether or not a user boarding the mobile body participates in an electronic meeting during movement of the mobile body; and comparing, when the user participates in the electronic meeting during movement of the mobile body, a scheduled end time of the electronic meeting with the estimated arrival time, and executing notification based on a comparison result.

According to the notification method in the configuration 8, it is possible to notify the user of the correspondence between the electronic meeting in which the user boarding the mobile body participates and the moving time of the mobile body. This allows the user to take measures, such as adjusting the travel time of the mobile body, in the case where the electronic meeting may end during movement of the mobile body. Therefore, the user can concentrate on the meeting in the mobile body, so that the burden on the user can be reduced.

(Configuration 9) A notification method executed by a computer, comprising: determining whether or not a user boarding a mobile body participates in an electronic meeting during movement of the mobile body; and comparing, when the user participates in the electronic meeting during movement of the mobile body, a moving time required for the mobile body to move to a destination with a meeting time during which the electronic meeting is conducted, and executing notification when the meeting time is shorter than the moving time.

According to the notification method in the configuration 9, notification to the user boarding the mobile body is performed when the electronic meeting in which the user participates may end during movement of the mobile body. This allows the user to take measures, such as adjusting the moving time of the mobile body. Therefore, the user can concentrate on the meeting in the mobile body, so that the burden on the user can be reduced.

(Configuration 10) A non-transitory computer-readable storage medium storing a program for causing a computer to function as: an acquisition unit that acquires a destination to which a mobile body moves and an estimated arrival time of the mobile body arriving at the destination; a meeting determination unit that determines whether or not a user boarding the mobile body participates in an electronic meeting during movement of the mobile body; a notification unit that performs notification to the user and outputs information to an external device that performs processing related to the electronic meeting; and a notification control unit that compares, when the user participates in the electronic meeting during movement of the mobile body, a scheduled end time of the electronic meeting with the estimated arrival time, and controls the notification unit to execute notification based on a comparison result.

When the computer executes the program in the configuration 10, it is possible to notify the user of the correspondence between the electronic meeting in which the user boarding the mobile body participates and the moving time of the mobile body. This allows the user to take measures, such as adjusting the travel time of the mobile body, in the case where the electronic meeting may end during movement of the mobile body. Therefore, the user can concentrate on the meeting in the mobile body, so that the burden on the user can be reduced.

(Configuration 11) A non-transitory computer-readable storage medium storing a program for causing a computer to function as: a meeting determination unit that determines whether or not a user boarding a mobile body participates in an electronic meeting during movement of the mobile body; a notification unit that performs notification to the user and outputs information to an external device that performs processing related to the electronic meeting; and a notification control unit that compares, when the user participates in the electronic meeting during movement of the mobile body, a moving time required for the mobile body to move to a destination with a meeting time during which the electronic meeting is conducted, and controls the notification unit to execute notification when the meeting time is shorter than the moving time.

When the computer executes the program in the configuration 11, the user boarding the mobile body is notified in the case where the electronic meeting in which the user participates may end during movement of the mobile body. This allows the user to take measures, such as adjusting the moving time of the mobile body. Therefore, the user can concentrate on the meeting in the mobile body, so that the burden on the user can be reduced.

REFERENCE SIGNS LIST

1 . . . Vehicle (mobile body), 2 . . . Meeting server, 3 . . . User terminal, 10 . . . Notification device, 13 . . . Communication device, 14 . . . GNSS, 15 . . . Touch panel, 16 . . . Speaker, 17 . . . Microphone, 18 . . . Camera, 100 . . . Processor, 101 . . . Reception unit, 102 . . . Acquisition unit, 103 . . . Notification control unit, 104 . . . Communication state determination unit, 105 . . . Notification unit, 106 . . . Meeting determination unit, 107 . . . Route search unit, 108 . . . Route guidance unit, 120 . . . Memory, 121 . . . Control program, 122 . . . Application (program), 123 . . . Map DB, 124 . . . Search condition.

What is claimed is:

1. A notification device, comprising a processor that is configured to:
acquire a destination to which a mobile body moves and an estimated arrival time of the mobile body arriving at the destination;
determine whether or not a user boarding the mobile body participates in an electronic meeting during movement of the mobile body;
perform notification to the user and outputs information to an external device that performs processing related to the electronic meeting;
compare, when the user participates in the electronic meeting during movement of the mobile body, a scheduled end time of the electronic meeting with the estimated arrival time, and controls to execute notification based on a comparison result; and
search for a parking place that matches a condition in an area of a prescribed size including the destination, the condition including that the mobile body can be parked and that a communication state of wireless communication used by the user to participate in the electronic meeting satisfies a preset standard and,
when the parking place that matches the condition is present, does not perform the notification, and
when the parking place that matches the conditions is not present and when the estimated arrival time is earlier than the scheduled end time of the electronic meeting, execute the notification.

2. The notification device according to claim 1, wherein when the parking place that matches the condition is present, the processor displays a parking place guide screen that guides a position of the parking place.

3. The notification device according to claim 1, wherein the processor is configured to search for a first moving route to the destination based on a prescribed search condition, and
when the estimated arrival time in a case of moving along the first moving route is earlier than the scheduled end time of the electronic meeting, the processor is configured to search for a second moving route along which the mobile body arrives at the destination at time that is later than the scheduled end time of the electronic meeting, and to perform notification related to the second moving route.

4. The notification device according to claim 3, wherein the processor is configured to determine the communication state of wireless communication used by the user to participate in the electronic meeting, and
when it is determined that the communication state in the first moving route or the second moving route is poor, the processor is configured to search for a third moving route better in the communication state of the wireless communication, and to perform notification related to the third moving route.

5. The notification device according to claim 4, wherein even when an input of the user indicating that the user does not use the third moving route is accepted, the processor is configured to notify a determination result of the communication state.

6. A notification method executed by a computer, comprising:
acquiring a destination to which a mobile body moves and an estimated arrival time of the mobile body arriving at the destination;
determining whether or not a user boarding the mobile body participates in an electronic meeting during movement of the mobile body;
comparing, when the user participates in the electronic meeting during movement of the mobile body, a scheduled end time of the electronic meeting with the estimated arrival time, and executing notification based on a comparison result; and
searching for a parking place that matches a condition in an area of a prescribed size including the destination, the condition including that the mobile body can be parked and that a communication state of wireless communication used by the user to participate in the electronic meeting satisfies a preset standard, and
when the parking place that matches the condition is present, the notification is not performed, and when the parking place that matches the conditions is not present and when the estimated arrival time is earlier than the scheduled end time of the electronic meeting, the notification is executed.

7. A non-transitory computer-readable storage medium storing a program for causing a computer to:
acquire a destination to which a mobile body moves and an estimated arrival time of the mobile body arriving at the destination;
determine whether or not a user boarding the mobile body participates in an electronic meeting during movement of the mobile body;
perform notification to the user and outputs information to an external device that performs processing related to the electronic meeting; and
compare, when the user participates in the electronic meeting during movement of the mobile body, a scheduled end time of the electronic meeting with the estimated arrival time, and controls unit to execute notification based on a comparison result;
search for a parking place that matches a condition in an area of a prescribed size including the destination, the condition including that the mobile body can be parked and that a communication state of wireless communication used by the user to participate in the electronic meeting satisfies a preset standard, and
when the parking place that matches the condition is present, does not perform the notification, and
when the parking place that matches the conditions is not present and when the estimated arrival time is earlier than the scheduled end time of the electronic meeting, execute the notification.

* * * * *